(12) United States Patent
Dasdan et al.

(10) Patent No.: US 11,849,245 B2
(45) Date of Patent: *Dec. 19, 2023

(54) PARTICIPATION MANAGEMENT SYSTEM FOR VIDEOCONFERENCING

(71) Applicants: Atlassian Pty Ltd., Sydney (AU); Atlassian Inc., San Francisco, CA (US)

(72) Inventors: Ali Dasdan, Mountain View, CA (US); Stephen Deasy, Mountain View, CA (US)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/750,146

(22) Filed: May 20, 2022

(65) Prior Publication Data

US 2022/0279142 A1 Sep. 1, 2022

Related U.S. Application Data

(63) Continuation of application No. 17/017,621, filed on Sep. 10, 2020, now Pat. No. 11,343,460.

(51) Int. Cl.
*H04N 5/445* (2011.01)
*H04N 7/15* (2006.01)
*G10L 15/02* (2006.01)
*G06V 20/40* (2022.01)
*G06V 40/16* (2022.01)

(52) U.S. Cl.
CPC ............. *H04N 5/445* (2013.01); *G06V 20/40* (2022.01); *G06V 40/174* (2022.01); *G10L 15/02* (2013.01); *H04N 7/15* (2013.01)

(58) Field of Classification Search
CPC .......... H04N 5/445; H04N 7/15; H04N 7/152; H04N 21/00; G06V 20/40; G06V 40/174; G10L 15/02; G10L 25/63
See application file for complete search history.

(56) References Cited

U.S. PATENT DOCUMENTS

| | | | |
|---|---|---|---|
| 10,530,666 B2 * | 1/2020 | Venkitapathi | ......... H04L 43/045 |
| 2007/0005752 A1 | 1/2007 | Chawla et al. | |
| 2008/0034085 A1 | 2/2008 | Chawla et al. | |
| 2015/0015429 A1 | 4/2015 | Shepard et al. | |
| 2016/0007305 A1 | 3/2016 | Balasaygun et al. | |

(Continued)

*Primary Examiner* — Phung-Hoang J Nguyen
(74) *Attorney, Agent, or Firm* — Brownstein Hyatt Farber Schreck, LLP

(57) ABSTRACT

A method may include receiving a videoconference stream from a client device of a plurality of client devices participating in a videoconference, the videoconference stream comprising video content of a user of the client device and audio content of the user of the client device. The method may also include generating, during the videoconference and based at least in part on at least one of the video content and the audio content, a participation metric for the user of the client device, displaying, to the user and during the videoconference, first information based on the participation metric, updating the participation metric during the videoconference to produce an updated participation metric, and displaying, to the user and during the videoconference, second information based on the updated participation metric.

15 Claims, 8 Drawing Sheets

(56) References Cited

U.S. PATENT DOCUMENTS

| | | |
|---|---|---|
| 2017/0213192 A1 | 7/2017 | Kitada et al. |
| 2017/0228135 A1* | 8/2017 | Vendrow ............... H04L 65/403 |
| 2018/0336915 A1* | 11/2018 | Jalali ..................... G10L 21/10 |
| 2020/0111334 A1 | 4/2020 | Moussette et al. |
| 2021/0176428 A1 | 6/2021 | Peters et al. |

* cited by examiner

PARTICIPATION MANAGEMENT SYSTEM FOR VIDEOCONFERENCING

CROSS-REFERENCE TO RELATED APPLICATION(S)

This application is a continuation patent application of U.S. patent application Ser. No. 17/017,621, filed Sep. 10, 2020 and titled "Participation Management System for Videoconferencing," the disclosure of which is hereby incorporated herein by reference in its entirety.

TECHNICAL FIELD

The present disclosure is generally directed to videoconferencing systems and, more specifically, to systems and methods for managing and improving user participation in videoconferences.

BACKGROUND

Videoconferencing is a convenient way to communicate with other individuals for personal or business purposes. Videoconferencing may be more immersive and may facilitate more personal communications than conventional voice-only communication technologies. Videoconferencing may be especially useful for business settings and meetings with multiple participants, as the ability to see the other participants may facilitate more seamless conversations, help prevent participants from accidentally interrupting each other, and the like. Videoconferencing may also allow more frequent face-to-face communications when actual in-person meetings may be inconvenient or difficult.

SUMMARY

The present disclosure is generally directed to videoconferencing systems and methods for improving user engagement and participation during videoconferences. For example, while videoconferences may be more engaging than telephone conversations or conference calls, users may find participating in videoconferences to be more intimidating or more difficult. This may result in valuable opinions, ideas, and viewpoints being lost, to the detriment of productivity and the development of interpersonal relationships.

Figure 1:
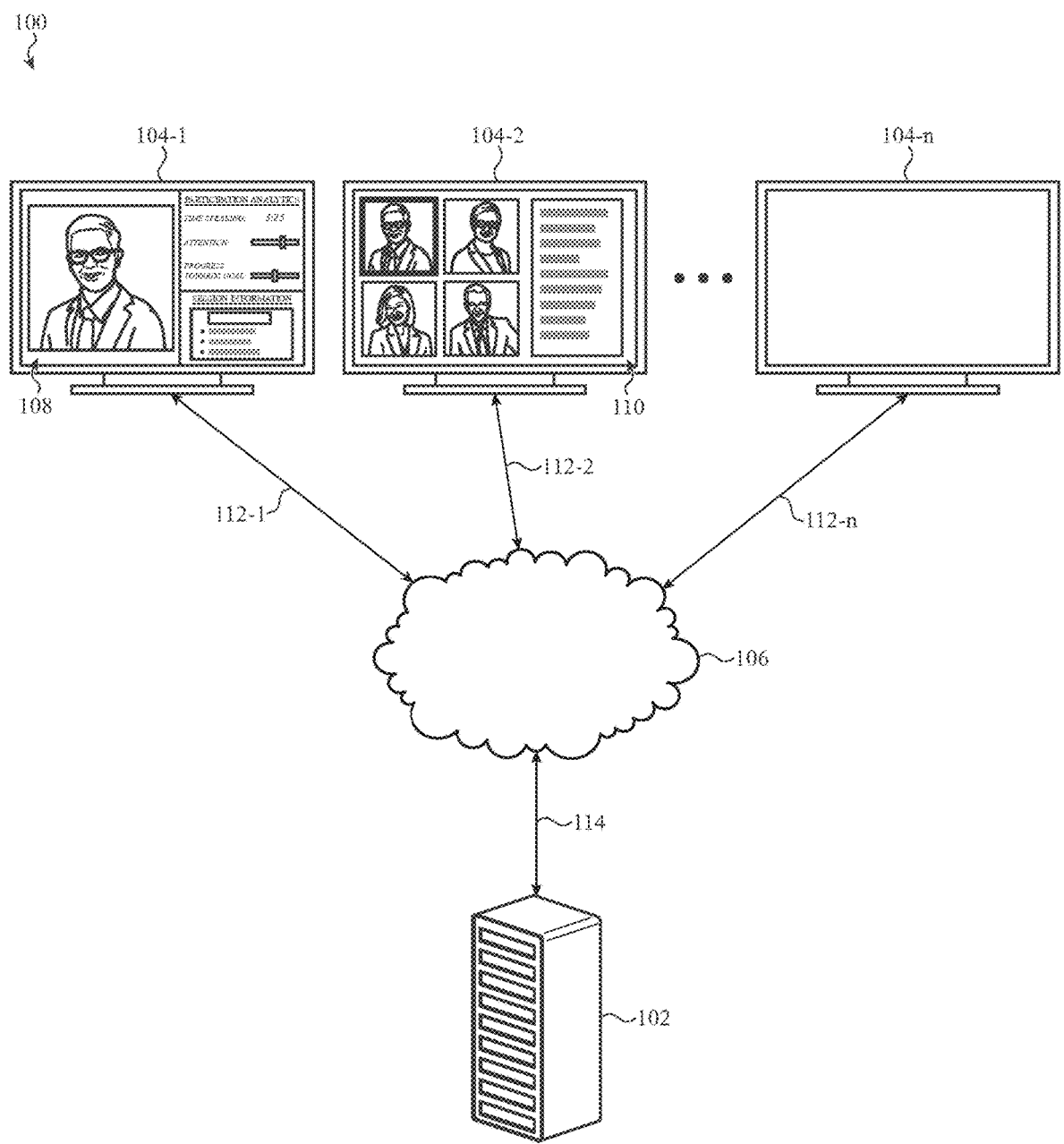
FIG. 1 depicts an example videoconferencing system in which various features of the present disclosure may be implemented.

While the invention as claimed is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION OF THE EMBODIMENTS

In the following description numerous specific details are set forth in order to provide a thorough understanding of the claimed invention. It will be apparent, however, that the claimed invention may be practiced without these specific details. In some instances, well-known structures and devices are shown in block diagram form in order to avoid unnecessary obscuring.

The present disclosure is generally directed to videoconferencing systems and methods for improving user engagement and participation during videoconferences. For example, while videoconferences may be more engaging than telephone conversations or conference calls, users may find participating in videoconferences to be more intimidating or more difficult. This may result in valuable opinions, ideas, and viewpoints being lost, to the detriment of productivity and the development of interpersonal relationships.

Accordingly, described herein is a videoconferencing systems and methods that can help quantify the extent to which participants are engaged in and contributing to videoconferences, and can help users improve their levels of participation and contribution. For example, the videoconferencing system can determine participation metrics for the participants, which the participants, and optionally a videoconference host, can use to understand and track their progress. Participation metrics may be based on one or more factors, such as the amount of time that a participant is speaking, the amount of time that a participant is looking at the videoconference content, facial expressions of the participant, or the like.

Participation metrics may be determined in real-time during a videoconference, based in part on the video and/or content of the videoconference streams from the participants of the videoconference. Participation metrics may also be based on historical participation data associated with the participants. For example, an employer may maintain a database of employment data for its employees, which may include aggregate or individual participation metrics for that individual. The stored participation metrics may be used to determine employees who should be encouraged to increase their participation in videoconferences (or other types of group interactions or meetings).

Participation goals may also be established for participants of a videoconference. The goals may be set by the user, or by a supervisor, mentor, or other individual. The goals may provide encouragement to increase participation, contribution, and/or engagement in the videoconferencing environment. Goals may be established for individual users for individual videoconference sessions, and may be based on historical participation metrics. For example, historical participation metrics may indicate that a particular individual speaks only 2% of the duration of a videoconference, on average. Accordingly, a goal may be established for that individual of a 5% speaking time in videoconferences. The individual's goal and their real-time participation metric (and/or a graphical indicator representing a real-time progress towards a goal) may be shown to the user during videoconferences so the user can track their progress and adjust their behavior accordingly. Real-time and historical goals and participation metrics for individuals may also be accessible to supervisors, mentors, or other authorized individuals. As described herein, the goals may be based on various different participation metrics, and may be scaled or modified based on the type of videoconference, the number of participants in a videoconference, or the like. The participation metrics and goals can be used to solicit a more diverse and inclusive user participation to make sure contributions are received from users having a variety of races, genders, nationalities, socioeconomic backgrounds, and other demographic qualities or characteristics.

As noted above, participation metrics and participation goals may be based on various different participation factors, such as an amount of time speaking, facial expressions, body language, speaking tone and rate, and the like. In order to foster success, a training interface may be provided in which users can see how their behavior may affect their participation metrics. For example, when using the training interface, the user's device may capture audio and video streams of the user, and sample participation metrics may be determined in real-time from the audio and video streams. The user can then practice different tones of voice and see how closely it matches a target or what emotions may be detected from those tones of voice, see how different facial expressions effect an attentiveness score, and the like. In some cases, samples of target facial expressions, body language, speech patterns, or the like may be displayed or otherwise provided to the user in the training interface so that the user can attempt to match the samples.

The videoconferencing systems described herein may leverage stored data about videoconference participants, including historical videoconference participation metrics, employee status/roles, stored participation goals, and the like. Accordingly, the videoconferencing systems may include or use data stores (e.g., databases), which may be integrated with an employer or other entity's existing data stores. More broadly, the videoconferencing system may be integrated with or part of other data stores and systems of a collaborative work environment. In some cases, the videoconferencing system leverages its integration with an employer or other entity's existing data stores to provide additional functionality related to videoconferencing systems. For example, the videoconferencing system may assist in creating and curating videoconferences by facilitating the creation and storage of agendas, recommending documents to be associated with or presented during a videoconference (e.g., based on a specified subject of the videoconference), recommending invitees for videoconferences (e.g., based on a specified subject of the videoconference and/or other invitees), and the like.

The videoconferencing systems and methods described herein may help improve user engagement and participation during videoconferences, and can help ensure that all participants are being afforded opportunities to contribute, especially those who have historically been underrepresented or have otherwise had less success in contributing their ideas and opinions in videoconference or other social or commercial settings. By encouraging and facilitating participation in this manner, opinions, ideas, and viewpoints may be elicited from a more varied, diverse group of individuals, leading to greater collaboration and more successful group outcomes. For example, the systems and techniques described herein may be used to promote diversity and inclusion by ensuring participation and contributions from a greater variety of users including a greater variety of races, genders, ages, or other demographic or socioeconomic backgrounds.

FIG. 1 depicts an example videoconferencing system 100 in which the techniques described herein may be employed. The videoconferencing system 100 includes a videoconference services system 102 and client devices 104 (104-1, . . . , 104-n) that communicate via a network 106 (e.g., the Internet). The videoconference services system 102 may include one or more servers, data stores (e.g., databases), programs, or other components, systems, or subsystems that provide functionality described herein. For example, the videoconference services system 102 may provide videoconferencing services, such as receiving video streams and audio streams from multiple client devices and providing the video and audio streams to other client devices. The videoconference services system 102 may also provide data storage and analytics services that enable or facilitate the generation of participation metrics and participation metric goals, videoconference scheduling services, and the like. While the videoconferencing services system 102 is shown as a single object in FIG. 1, the videoconference services system 102 may include a number of different servers, computers, computing systems, or the like, distributed over network or otherwise in communication with one another to provide the services of the videoconference services system 102.

The client devices 104 represent various types of client devices that may be used by participants in videoconferences. The client devices 104 may be devices such as laptop computers, mobile phones, tablet computers, desktop computers, televisions, dedicated videoconferencing systems, or the like. The client devices 104 may include cameras, microphones, and associated systems to capture video and/or audio content of a user, as well as displays and audio output systems to present other video and/or audio content associated with a videoconference.

The client devices 104 may send and receive videoconference streams to the videoconference services system 102 and/or other client devices via connections 112 (112-1, . . . , 112-n). Similarly, the videoconference services system 102 may send and receive videoconference streams via connection 114. Videoconference streams may include video content and audio content of the user of the client devices. The videoconference streams may also include other data from the client devices 104 and/or the videoconference services system 102, including documents, presentation materials, performance metrics, graphics, interactive content (e.g., checklists, quizzes), and the like. Other types of data transfer or communications between and among the client devices 104 and the videoconference services system 102 may also be provided via the connections 112.

The client devices 104 may be associated with different types of videoconference participants, and may provide different user interfaces based on the type or the role of the participant (and/or based on the preferences of the participant). For example, the client 104-2 may be associated with a review user. As used herein, a review user refers to a user who is authorized to see performance metrics of one or more other users. Accordingly, the client 104-2 may display a review-user interface 110 that includes videoconference streams of the participants as well as performance metrics and optionally other data for each of the participants. The client 104-1 may represent a participant who is not a review user, and as such may display a participant interface 108 that shows the videoconference stream of the presenter or an active speaker, and optionally the performance metric for the user of the client 104-1. While FIG. 1 shows one client with a review-user interface and one client with a participant interface, a videoconference may include many participants of different categories, and may include multiple review-users and participants.

Review users may be or become authorized as review users in various different ways, and may have varying different permissions. For example, a supervisor may be a review user for all of his or her subordinates, or a team leader may be a review user for all of the team members. These permissions and/or authorizations may be established by virtue of roles within a company or team, or the like. As another example, an individual may be allowed to authorize any other user to act as a review user. Thus, any individual may be able to select friends or unofficial mentors as review users to help the individual improve or increase their participation in videoconference settings. There is not necessarily a single hierarchy to or limitation on the number of review users and non-review users in a videoconference, and different users may be review users for different sub-groups of participants. In some cases there may be at least one participant (e.g., a host who initiated the videoconference) who is a review user for all other participants.

Figure 2:
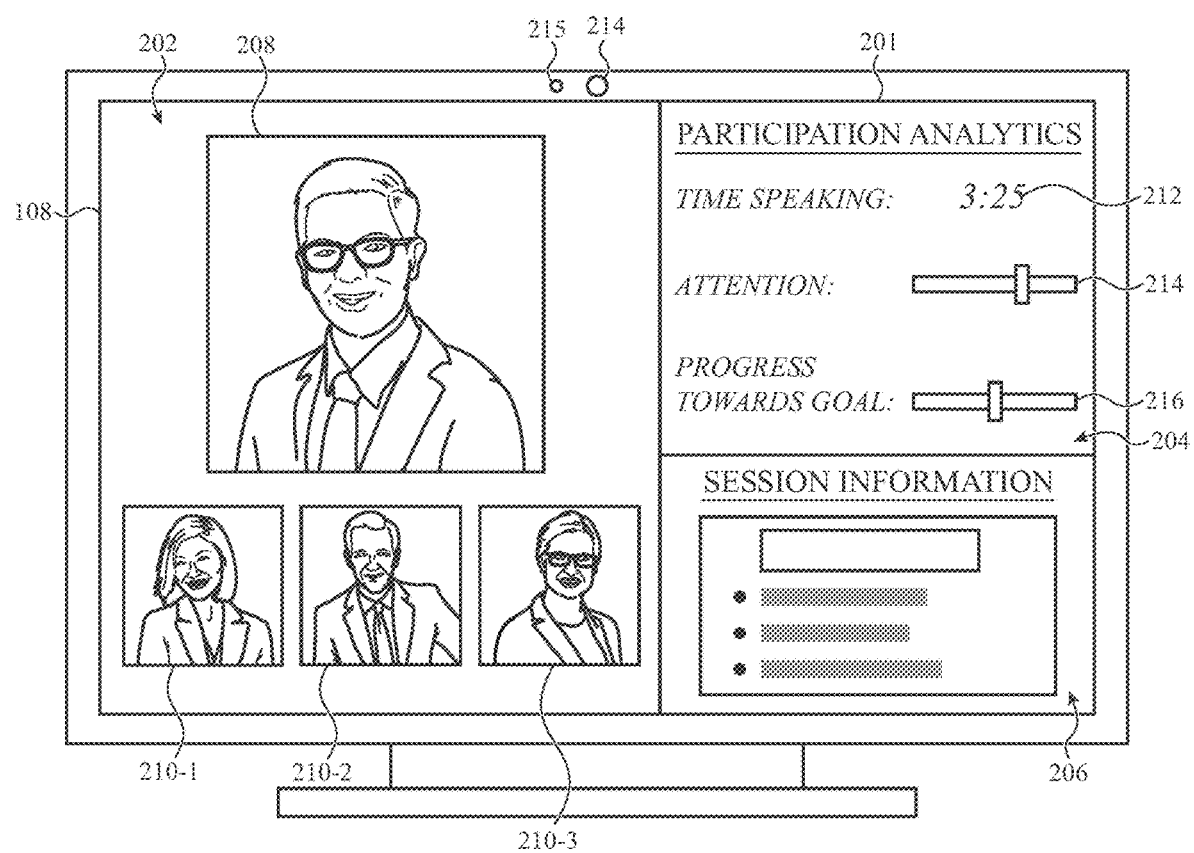
FIG. 2 depicts an example client device and user interface that may be used in the videoconferencing system described herein.

FIG. 2 depicts the client device 104-1 displaying an example participant interface 108. As noted above, the client device 104-1 may include a display 201 for displaying the participant interface 108, as well as a camera 214 for capturing images (e.g., video and/or still images) of a user of the client device 104-1, and a microphone 215 (or other audio capture device) for capturing audio of the user of the client device 104-1. The client device 104-1 may also include communications systems for sending and receiving videoconference streams.

The participant interface 108 may include a video stream region 202, a participation analytics region 204, and a session information region 206. In some cases, only a subset of these regions are shown at a given time, and the particular sizes and locations of the regions may be selectable by the user (and may be different than those shown in FIG. 2).

The video stream region 202 may show video streams of other participants. Video stream 208 may correspond to a host, presenter, or active speaker on the videoconference, and may be more prominently displayed (e.g., it may be larger than others). Video streams 210 (210-1, . . . , 210-n) may correspond to other participants in the videoconference, and may correspond to participants who are not currently talking, or are not the presenter or host. The video stream of the user of the client device 104-1 may also be included in the video stream region 202. The video stream of the user may be shown in the position of the video stream 208, or the video streams 210. In the example shown in FIG. 2, the video stream of the user of the client device 104 may be video stream 210-2. The particular size and arrangement of the video streams may be different than what is shown in FIG. 2, and may be customizable by the user of the client device 104-1.

The session information region 206 may display information associated with the videoconference. For example, the session information region 206 may display a presentation (e.g., a slide deck), documents, a meeting agenda, a checklist, images, interactive content (e.g., a survey or quiz), a "whiteboard" region that accepts text or drawing inputs, or the like. The contents of the session information region 206 may be defined by a meeting host, though permissions may also be granted for other participants to change, modify, or update the contents of the session information region 206.

The participation analytics region 204 may display, to the user of the client device 104-1 and during a videoconference, participation metrics and/or information that is based at least in part on the participation metrics. The participation metrics shown in FIG. 2 include a time speaking metric 212 and an attention metric 214. The participation analytics region 204 also shows a progress towards a participation metric goal 216. The values of the participation metrics (and/or the information that is based on participation metrics) may be displayed in various ways, and the manner of display may be based at least in part on the metric itself. For example, the time speaking metric 212 may display an actual amount of time that the user of the client device 104-1 has been speaking during this videoconference. In other cases, the time speaking metric 212 may display how long the user of the client device 104-1 has spoken as a percentage of the elapsed videoconference time (e.g., if the user was speaking for 2 minutes of the first 4 minutes of a videoconference, the time speaking metric 212 may show a 50% value at the 4 minute mark of the videoconference). The time speaking metric 212 may be determined, by the videoconferencing system 100, based at least in part on an analysis of the audio content in the videoconference stream from the client device 104-1 (e.g., analyzing the audio content to determine the duration that the user is speaking).

The attention metric 214 may represent a percentage of the elapsed videoconference time that the user of the client device 104-1 has been attentive to the videoconference. The attention metric 214 may be determined by the videoconferencing system 100 based on one or more factors. For example, the attention metric 214 may be determined based on an amount of time that the user is looking at the videoconference content (e.g., as determined by analyzing the video content of the user's videoconference stream to determine where the users eyes are directed and comparing that with the location of the videoconference content on the client device's screen). As another example, the attention metric 214 may be based on an amount of time that the user spends with his or her microphone muted or their camera deactivated.

As another example, the attention metric 214 may be determined based on a duration that the user's facial expression or body language is indicative of inattentiveness. This may include, for example, analyzing the video content of the user's videoconference stream, extracting or otherwise identifying features of the user's face or body in the image, and determining whether the identified features are indicative of inattentiveness. Examples of expressions or body language that may be indicative of inattentiveness may include, for example, closed eyes, nodding head, slumped shoulders, a head turned away from the display, resting a head on ones hands, or the like. In some cases, machine learning techniques may be used to analyze video content to identify facial expressions or body language that are indicative of inattentiveness. For example, the video content may be analyzed using a model that is trained on a corpus of images (e.g., still or video images) that are classified or tagged as being associated with attention or inattention.

As another example, the attention metric 214 may be based on an amount of time that the user spends interacting with computer content or programs other than the videoconference content. For example, the client 104-1 may monitor what applications, websites, and/or files are being used or accessed while the user is participating in the videoconference. The user's attention metric 214 may be decreased if the user is engaging with applications, websites, files, or the like that are not associated with the videoconference (e.g., email applications, messaging applications, web browsers, etc.). The attention metric 214 may also be based at least in part on whether the user is speaking while his or her microphone is muted (which may be detected by analyzing the user's face to detect lip movements), indicating that the user is interacting with people or things other than the videoconference content. The attention metric 214 may be based on one of the foregoing factors individually, or a combination of the foregoing factors (and/or additional factors not explicitly described).

The participation analytics region 204 may also display a progress towards a participation metric goal 216. The participation metric goal 216 may indicate the user's progress towards a participation metric goal that has been established for a given videoconference. The participation metric goal may relate to a single participation metric, such as an amount of time speaking or an attentiveness level, or it may be based on a combination of multiple participation metrics. For example, the participation metric goal may be based on an average (or a weighted average) of a multiple participation metrics. In some cases, separate participation metric goals may be established and displayed for individual participation metrics.

Different participation metric goals for the users may also be established for videoconferences based on properties of the videoconferences. For example, for a videoconference that is primarily a presentation (e.g., with limited or no opportunity for participants to speak), the participation metric may be based on attentiveness, whereas a videoconference that is meant to be a collaborative discussion among members of a team, the participation may be based entirely or primarily on time speaking.

Participation metric goals for users may also be dynamically updated for individual videoconferences based on factors such as the number of participants in a videoconference, the duration of the videoconference, the goals of other participants in the videoconference, the role of an individual in a videoconference, or the like. For example, goals based on speaking time may be scaled or modified for a given videoconference so that each participant in the videoconference can achieve their goals. This may help prevent circumstances where participants are incentivized to maximize their own speaking time at the expense of others. By showing a participant's progress towards a goal to the user, in real-time during the video conference, the user can not only track their own progress so that they can achieve their goals, but also visualize when they have met their goals so that they can allow and encourage other participants to increase their contributions. This may foster a more collaborative, encouraging environment in which participants who may feel intimidated or otherwise unable to contribute their opinions are more consistently encouraged to become engaged. Indeed, by fostering greater participation in this way, the system may result in greater sharing of viewpoints and opinions from a group having greater diversity across factors such as age, socioeconomic status, gender, race, employment status, and the like.

Participation metric goals for users may also be based on one or more attributes or properties of the users themselves. For example, participation metric goals may be different for junior employees (e.g., lower) as compared to more senior employees. As another example, participation metrics may be based on the user's title within an organization (e.g., manager, engineer, salesperson, etc.). Other example attributes or properties that may be used in generating participation metric goals may include employee role, employee title, seniority level, duration of employment, historical participation metric information, network connectivity information (e.g., Internet speed), demographic information (e.g., geographical location, age, salary, previous employment roles, etc.), or the like. Such information may be stored in a data store, such as a user profile database (e.g., the user profile database 808, FIG. 8).

Attributes and/or properties such as those described above may be used to scale or weight participation metric goals for individual users. For example, a participation metric goal may be initially be calculated for an individual without regard to the duration of their tenure with an organization, and then scaled by a multiplier based on the duration of their tenure with an organization. As one non-limiting example, an employee who has been with an organization less than 1 year may have their participation metric goal scaled by a 0.8 multiplier (e.g., so their goal is less than a more senior employee).

Participation metric goals may also be based at least in part on the attributes and/or properties, as well as the participation metrics and participation metric goals, of other users of a videoconferencing system. For example, a participation metric goal for a given user may be based at least in part on a normalized distribution of participation metrics of a group of other users. As a specific example, a participation metric goal for a given user may be set to be equal to the average participation metric of a group of other users. The participation metric goal may be scaled based on factors such as seniority within an organization, or other attributes and/or properties of the user (as described above). The group of users from which a normalized distribution (or average, mean, median, or other suitable value) may be determined may be a subset of all of the users of the system, and the subset may be selected or filtered based on any suitable criteria. In some cases, the subset of users may be those with one or more attributes and/or properties in common with the given user for whom a participation metric goal is being generated. For example, the subset of users may be those having a same or equivalent job title, or those having the same or similar tenure within an organization, or those from the same or similar geographic area as the given user.

The subset of users may be based on a single attribute and/or property, or multiple attributes and/or properties associated with users (e.g., in the user profile database 808). For example, as noted above, the subset of users may be those having the same job title as the given user. As another example, the subset of users may be those having a same job title, similar tenure, and living in the same geographic region as the given user. Users may also be able to determine their own participation metric goals based on the average metrics of different subsets of users, and may be able to determine multiple participation metrics based on the participation metrics of multiple different subsets of users. For example, a user may establish one participation metric goal that is set to the average participation metric of all users of the same age, and another goal that is set to the average participation metric of all users having the same job title.

While the foregoing examples, describe establishing performance metric goals as the average value of performance metrics of others, this is merely one example, and goals may be set at a highest performance metric in a distribution, or a percentile rank, or a number of standard deviations from a particular target. For example, a user may set their performance metric goal to be above the $80^{th}$ percentile for all users of the same job title and tenure. Further, such performance metric goals may be set by the user, the user's supervisor or employer, or automatically by the videoconferencing system 100.

The information in the participation analytics region 204 may be generated by one or more components of the videoconferencing system 100 in real-time during a videoconference and based in part on the audio and/or video content of the client's videoconference stream. In some cases, the information in the participation analytics region 204 may be generated by a client device 104, the videoconference services system 102, or a combination thereof. Further, the participation metrics and the progress towards a participation metric goal may be updated during the videoconference based on the audio and/or video content of a user of the client device during the videoconference. In this way, each participant can see their progress and participation metrics change in real-time, and can have an accurate picture of their progress and the degree to which they are contributing.

Figure 3A:
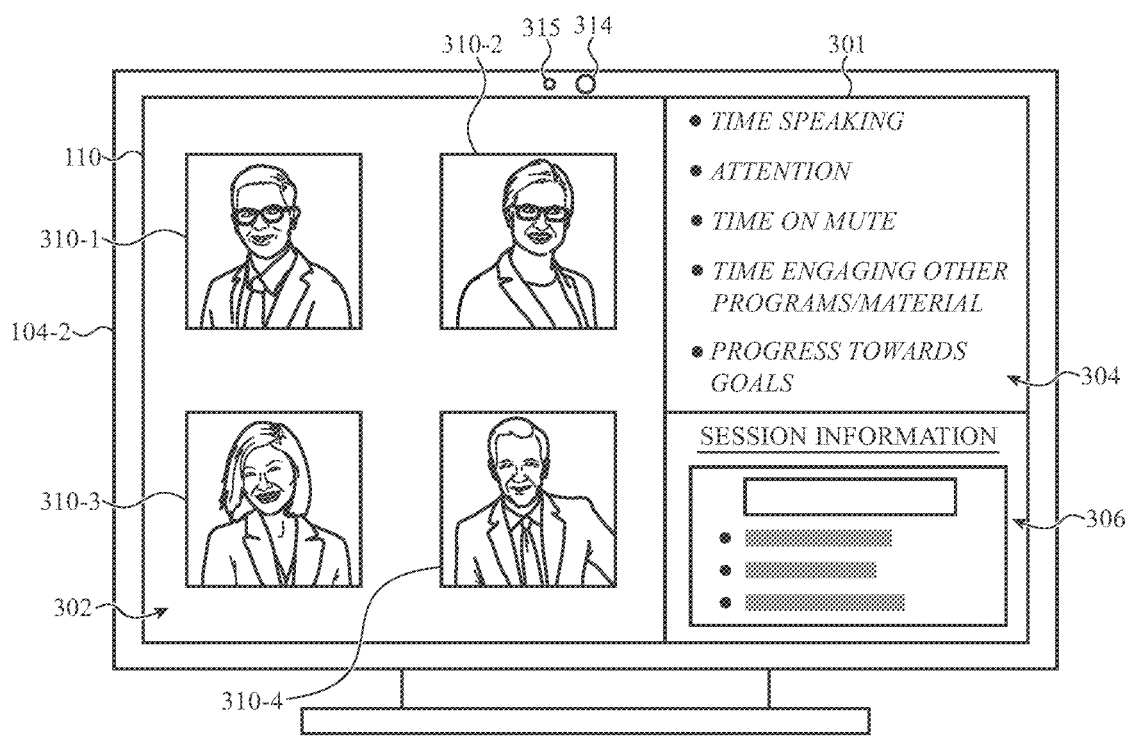
FIGS. 3A-3D depict examples of another client device and user interface that may be used in the videoconferencing system described herein.

FIG. 3A depicts the client device 104-2 displaying an example review-user interface 110. The client device 104-2 may include a display 301, camera 314, and microphone 315, all of which may be similar to the corresponding components described with respect to FIG. 2, and the details of these components are omitted here for brevity.

The review-user interface 110 may include a video stream region 302, a participation metrics region 304, and a session information region 306. In some cases, only a subset of these regions are shown at a given time, and the particular sizes and locations of the regions may be selectable by the user (and may be different than those shown in FIG. 3A).

The video stream region 302 may show video streams 310 (210-1, . . . , 210-n) of other participants, and may optionally show all of the participants for whom the user of the client device 104-2 is a review user. The particular size and arrangement of the video streams may be different than what is shown in FIG. 3A, and may be customizable by the user of the client device 104-2.

The session information region 306 may be the same as or analogous to the session information region 206, and may display information associated with the videoconference. For example, the session information region 306 may display a presentation (e.g., a slide deck), documents, a meeting agenda, a checklist, images, interactive content (e.g., a survey or quiz), a "whiteboard" region that accepts text or drawing inputs, or the like. The contents of the session information region 306 may be defined by a meeting host (which may be the user of the client device 104-2), though permissions may also be granted for other participants to change, modify, or update the contents of the session information region 306.

The participation metrics region 304 may display, to the user of the client device 104-2 and during a videoconference, selectable participation metrics (and/or information that is based at least in part on the participation metrics) for participants for whom the user of the client device 104-2 is a review user. For the purposes of FIG. 3A, the user of the client device 104-2 is a review user for all of the participants shown in the video stream region 302, though this is not necessarily true for all implementations.

Figure 3B:
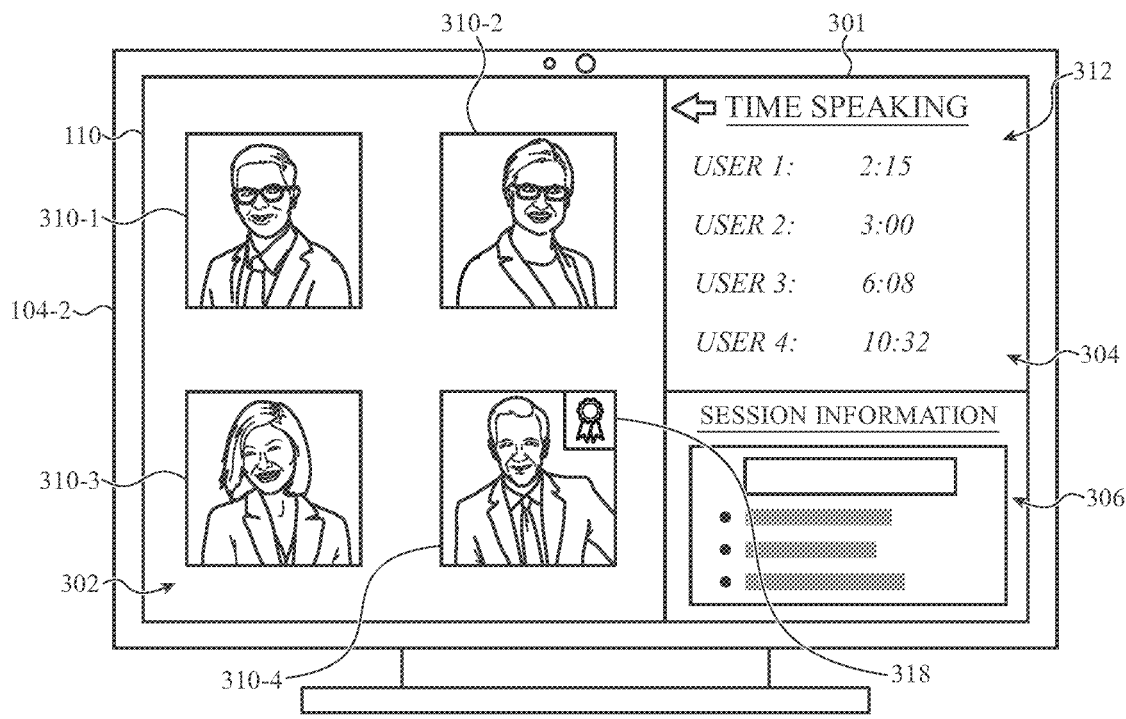

The participation metrics shown in the participation metrics section 304 may be selectable by the review user. Upon selection of a participation metric, the selected participation metrics of the target users (e.g., those shown in video streams 310) may be displayed to the review user. For example, FIG. 3B illustrates the client device 104-2 after the review user has selected the "time speaking" participation metric. As shown, the participation metrics section 304 may display a list of "time speaking" metrics for each of the users shown in the video stream region 302. The time speaking metrics may be displayed in ranked order (e.g., lowest to highest) to help the review user quickly determine who might not be getting enough opportunities to contribute to the videoconference. The review user can then take remedial measures, such as inviting users who have lower participation metrics to contribute to the videoconference.

While FIG. 3B illustrates one example participation metric ("time speaking"), a similar listing may appear for any selected participation metric or progress towards a goal. This may allow a review user to see individual metrics for the users and gain a more granular understanding of their level or contribution, participation, and/or attentiveness to the videoconference.

In some cases, graphical indicators may be displayed in association with the video streams of users who have achieved their participation metric goal for a given participation metric. For example, FIG. 3B includes a graphical indicator, such as a badge, shown in association with (e.g., overlaid on) the video stream 310-4, indicating that the user associated with the video stream 310-4 has met his goal for the selected "time speaking" participation metric. This may provide a fast and efficient way to indicate to the review user who has met their goals and who should be encouraged to contribute more to the discussion.

Figure 3C:
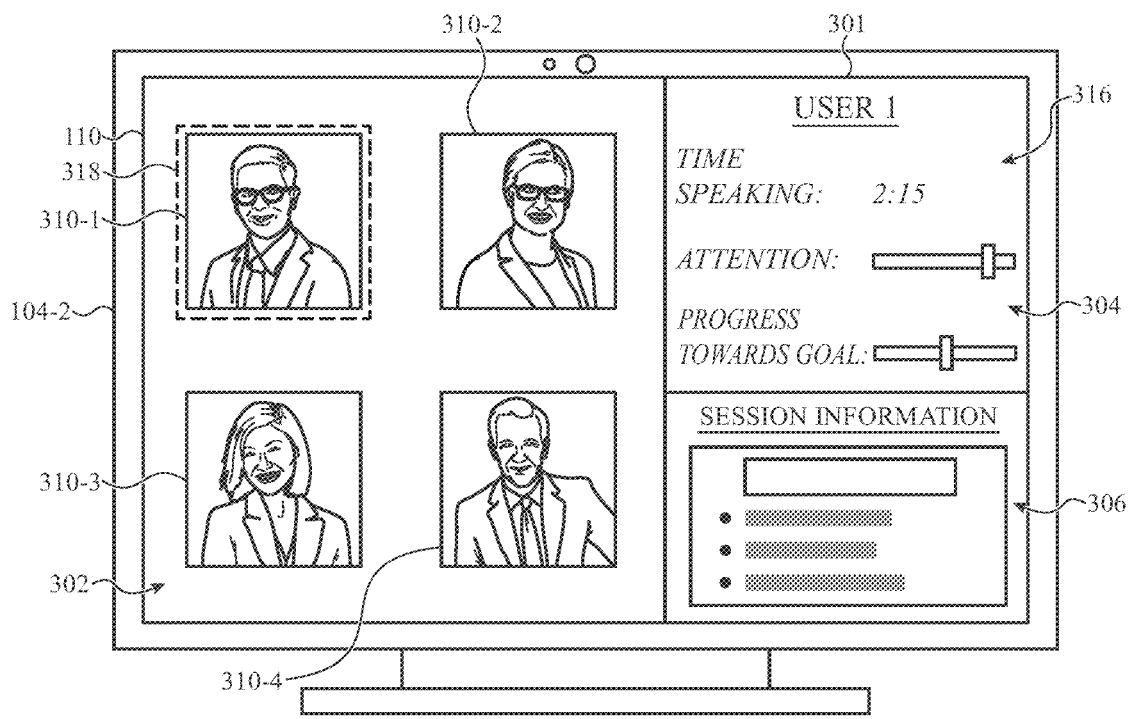

FIG. 3B illustrates an example interface in which a single participation metric (e.g., "time speaking") is shown for each user. In some cases, the review user may prefer to view multiple participation metrics for a single participant. This may be achieved by the review user clicking on, tapping, or otherwise selecting a particular video stream 310. FIG. 3C illustrates an example of the review-user interface 110 in which the first video stream 310-1 has been selected. Box 318 (or any other suitable graphical indicator) may be graphically indicate which of the video streams 310 has been selected. Once a video stream has been selected, multiple participation metrics and progress indicators for the associated user may be displayed in the participation metrics section 304. The user may select other video streams in order to view the participation metrics and progress indicators for those other users.

Figure 3D:
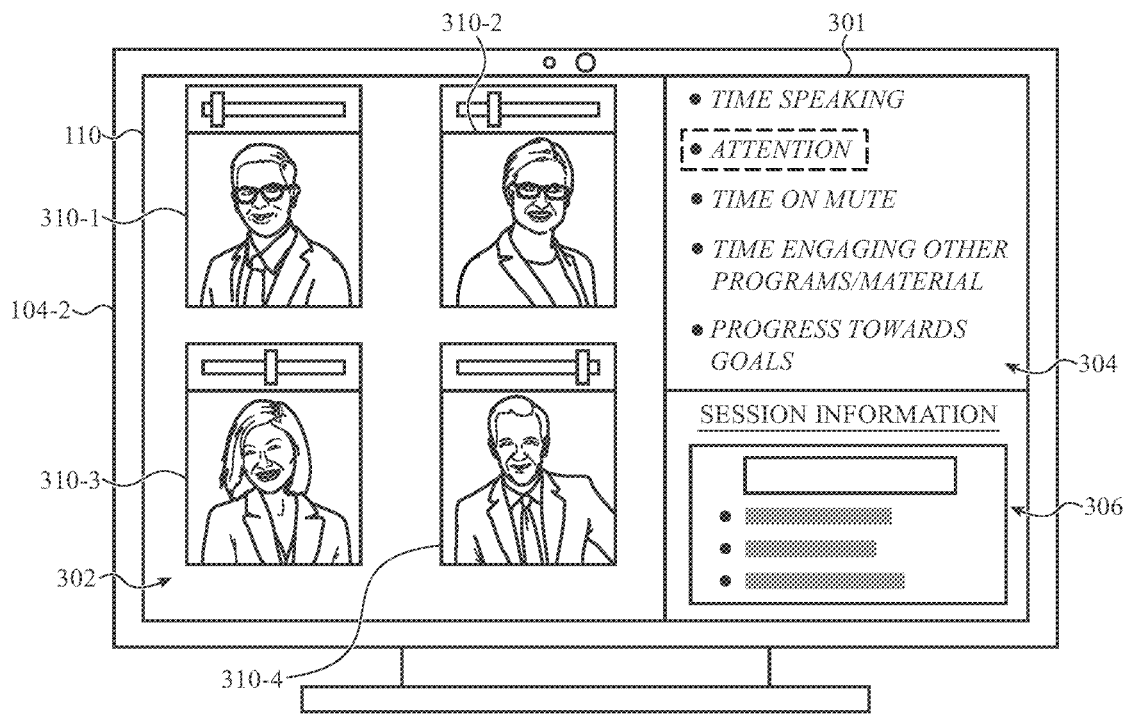

FIG. 3D illustrates another example interface for visualizing participation metrics for multiple users. In particular, a review user may select a participation metric from the list of participation metrics in the participation metrics section 304 (e.g., the "attention" participation metric, as indicated by the dashed box in FIG. 3D). In response to the selection, graphical indicators 316 (316-1, . . . , 316-n) representing the "attention" participation metric for each user is shown in conjunction with the associated video stream. The graphical indicators 316 may provide a fast and efficient way for the review user to visualize the relative participation metrics of each of the users.

In some cases, in response to a selection of a participation metric, the video streams 310 may be displayed in ranked order based on the values of the participation metrics associated with the video streams 310 (e.g., lowest to highest), thereby causing the users who may benefit from some encouragement to contribute to the videoconference to be more prominently displayed to the review user. Instead of or in addition to displaying the video streams 310 in ranked order, the video streams of users with lower participation metrics may be emphasized or graphically differentiated in other ways. For example, the video streams may be color-coded based on their participation metrics (e.g., lower values may be shown with a red border, middle values with a yellow border, and higher value with a green border). As another example, video streams of individuals having lower participation metrics may be shown larger than those with higher metrics, and/or video streams of individuals having higher metrics (and/or those who have already achieved a participation metric goal) may be removed from the video stream region 302 (until that individual begins speaking again and/or is selected by the review user).

While FIGS. 2-3D show example interfaces with a particular number and arrangement of video streams, it will be understood that these are merely exemplary, and more or fewer video streams may be shown, and they may be shown in arrangements other than those depicted in FIGS. 2-3D. Further, the positions, locations, shapes, sizes, and amount of video streams shown in an interface may be selectable and/or customizable by a user. Where a videoconference includes more participants than can practically be shown on a single screen or interface, a user may select a subset of video streams to view (or the videoconferencing system 100 may select the subset automatically). In some cases, whomever is the active speaker, as determined by the videoconferencing system 100, may be automatically displayed larger, more prominently, or in association with a graphical indicator showing that they are the active speaker.

Further, while certain example graphics are shown in the figures to demonstrate how participation metrics and progress towards goals may be presented to users, other types of graphics, text, or the like may be used instead of or in addition to those shown. For example, times, percentages, numerical values, color-coded graphical indicators, scaled values (e.g., a value on a 1-10 or 1-100 scale), emoticons, or the like may be used to indicate participation metrics and/or progress towards goals.

As noted above, the videoconferencing system described herein may be integrated with or part of other data stores and systems of a collaborative work environment, such as an employer, company, or the like. In such cases, some users may have authority to view and/or monitor the performance metrics of other users, set and monitor performance metric goals, and the like. Accordingly, the videoconferencing system may provide a management interface that may be used to view performance metrics and view and set goals for users. The management interface may be available outside of actual videoconference events so that managers, supervisors, or other authorized individuals can view and modify data outside the context of actual videoconferences.

Figure 4:
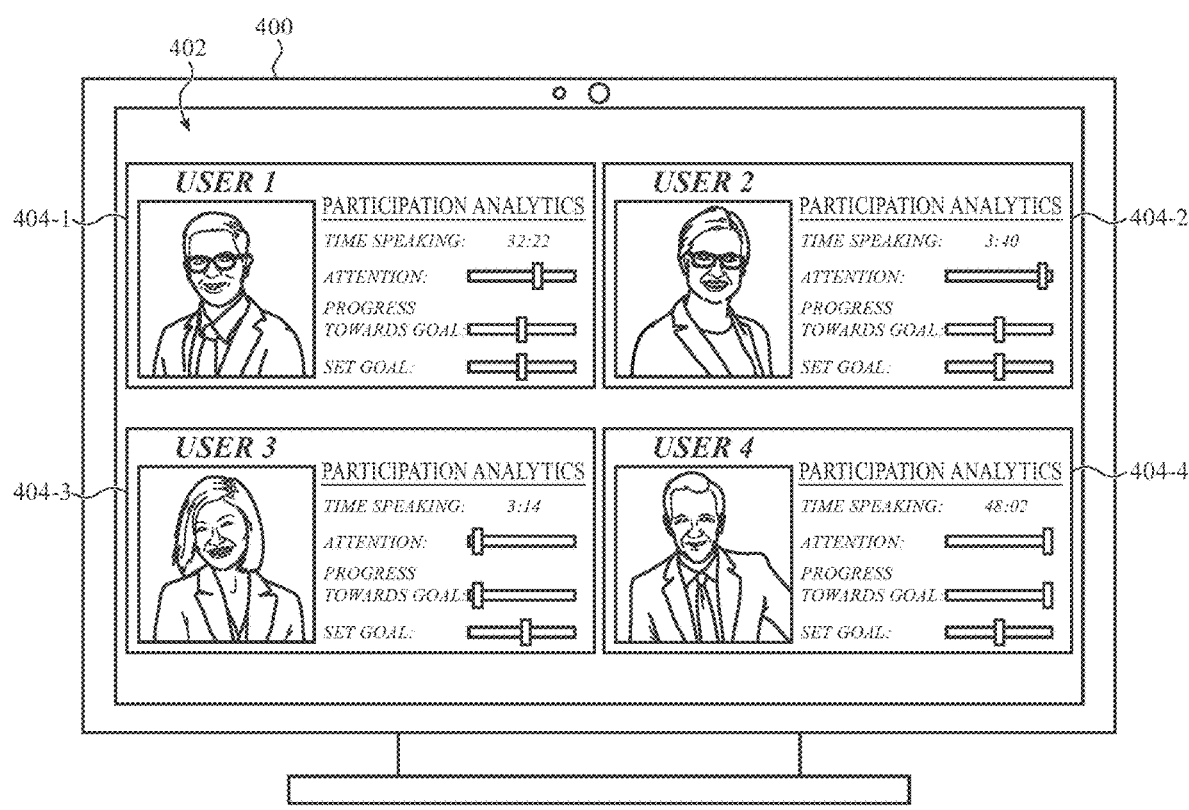
FIG. 4 depicts an example of a client device and user interface that may be used to view performance metrics for users of the videoconferencing system described herein.

FIG. 4 depicts a client device 400 showing an example management interface 402. The management interface 402 may display user profiles 404 (404-1, . . . , 404-n), or portions thereof, of users of the videoconferencing system. The user profiles may show historical participation metrics, progress towards participation goals, and allow the supervisor or review user to set and/or modify performance metric goals for the users. The information in the user profiles 404 may be provided from a user profile data store, which may be part of the video conferencing system, and which may be shared with other systems such as a human resources system, an employee database, and the like. The data shown in the user profiles 404 may therefore be accessible by systems other than the videoconferencing system.

The videoconferencing system may also provide a training interface where individual users can monitor their progress, view their participation metrics (e.g., metrics for individual videoconferences and/or cumulative metrics over multiple videoconferences), and view and modify their own performance metric goals. The training interface may also allow users to experience how the videoconferencing system analyzes their performance outside of the context of a live videoconference.

Figure 5:
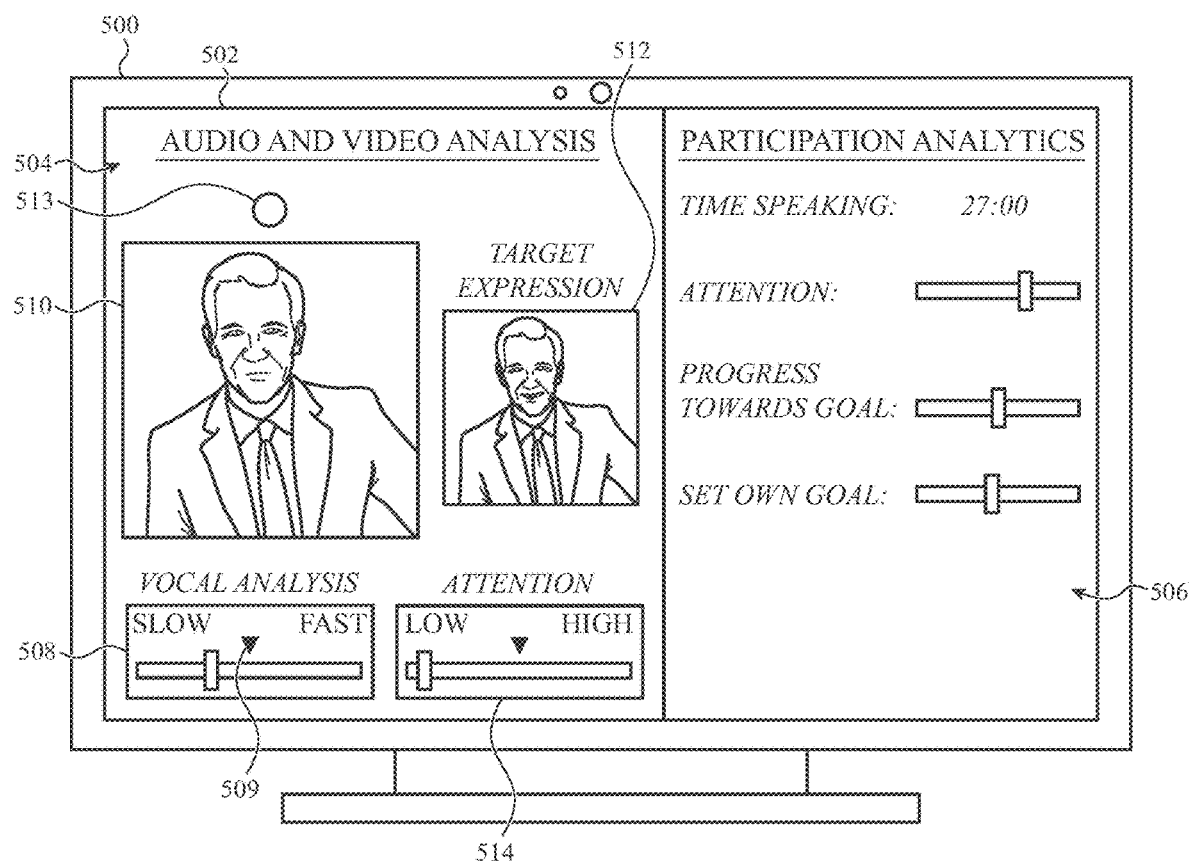
FIG. 5 depicts an example of a client device and user interface that may be used for training a user in the operations of the videoconferencing system described herein.

FIG. 5 depicts a client device 500 showing an example training interface 502. The training interface 502 may include an audio and video analysis region 504 (referred to herein as an A/V analysis region 504 for brevity) and a participation analytics region 506. The participation analytics region 506 may display participation metrics for the user who is interacting with the training interface 502. For example, the participation analytics region 506 may display metrics such as time speaking (e.g., total time over multiple videoconferences, average time per videoconference, average percentage of videoconference spent speaking, or any other suitable formulation), attention levels, etc. The participation analytics region 506 may also show the user's progress towards a participation metric goal (either set by the user or a supervisor, review user, or the like), and allow the user to establish his or her own participation metric goal.

The A/V analysis region 504 may provide a real-time view into how the videoconferencing system analyzes the user's audio and video streams to determine factors such as the user's attention, engagement, and the like. For example, the A/V analysis region 504 may display a video stream 510, showing a live view of the feed from the client's camera. The A/V analysis region 504 may optionally show a target expression region 512, which may be an image of the user or a generic image of an attentive person. The user may attempt to modify his or her expression, body language, body positioning, or the like to mimic that shown in the target expression 512. In some cases, the videoconferencing system may compare the video stream 510 to the target expression 512 and provide an indication (e.g., a graphical indicator 513, such as a green dot) when the user's actual expression matches the target expression 512. The user's expression need not match the target expression exactly, and the videoconferencing system may indicate a match even when the user's expression deviates somewhat from the target expression. Further, the user may be able to select the particular image or expression to be used as the target expression (e.g., so that the user can establish a comfortable or natural expression for themselves), or it may be generated automatically by the videoconferencing system, such as by capturing a still image of the user at a time when the user's attention was determined to be high.

The A/V analysis region 504 may also include a vocal analysis indicator 508. The vocal analysis indicator may indicate the user's speaking speed, and display a target speaking speed, as shown by the indicator 509. To use the vocal analysis indicator 508, the user may speak into his or her microphone, and the videoconferencing system may perform vocal analysis on the audio stream from the client device 500 to determine the user's speaking speed. The user may then modify his or her speaking speed to see how the system reacts, and can practice speaking at a pace that is at or near the target pace. The user may also be able to establish a target or baseline pace by recording themselves speaking at a natural and comfortable pace.

In some cases, the videoconferencing system may also analyze the prosody of the user's speech, and provide feedback as to what emotions or sentiments may be detectable in the user's voice. The training interface 502 may then provide an indication of what emotions or sentiments are detected so that the user can modify his or her speech patterns, tone of voice, and the like, and see how the changes affect the detected emotions or sentiments. For example, if the videoconferencing system detects sarcasm, anger, or frustration in the user's speech patterns, the user can be more aware of how their speech patterns may be perceived by others. The user may also be able to establish a target or baseline prosody by recording themselves speaking at a natural and comfortable tone and inflection, so that they can monitor how or if the prosody of their voice changes when they are speaking.

The A/V analysis region 504 may also include an attention analysis indicator 514. The attention analysis indicator 514 may display a real-time view of how the videoconferencing system is measuring the user's attention. As noted above, an attention participation metric may be based on various different factors, including gaze direction (e.g., what is the user looking at), what applications on the client device 500 the user is interacting with, the user's body language and/or facial expression, and the like. When using the training interface 502, the user may test out different actions, such as looking at different portions of the display, interacting with other applications, muting their microphone, and see how they affect the way that the system measures attention. Further, users may provide video and/or image data that may be used to generate a baseline of attentiveness, so that the natural differences in users' expressions and appearances may be accommodated by the system.

In some cases, the training interface 502 may provide information to the user that is not used as a factor in any participation metrics. For example, prosody and facial expression analyses may be provided for convenience of the user and to help them improve or change their performance in videoconferences, but they may be omitted from participation metrics, monitoring, recording, or the like. Further, users may be able to determine the extent to which any of their audio and/or video content is reviewed, analyzed, stored, or the like. For example, a user may select which types of performance metrics are permitted to be generated, what information or data may be used to generate the performance metrics, who may or may not see or store the performance metrics (or information or data on which they are based), and the like. In some cases, users may be able to opt-out of any and all recording or analysis of their videoconference streams and/or other associated data (e.g., application monitoring, etc.).

Figure 6:
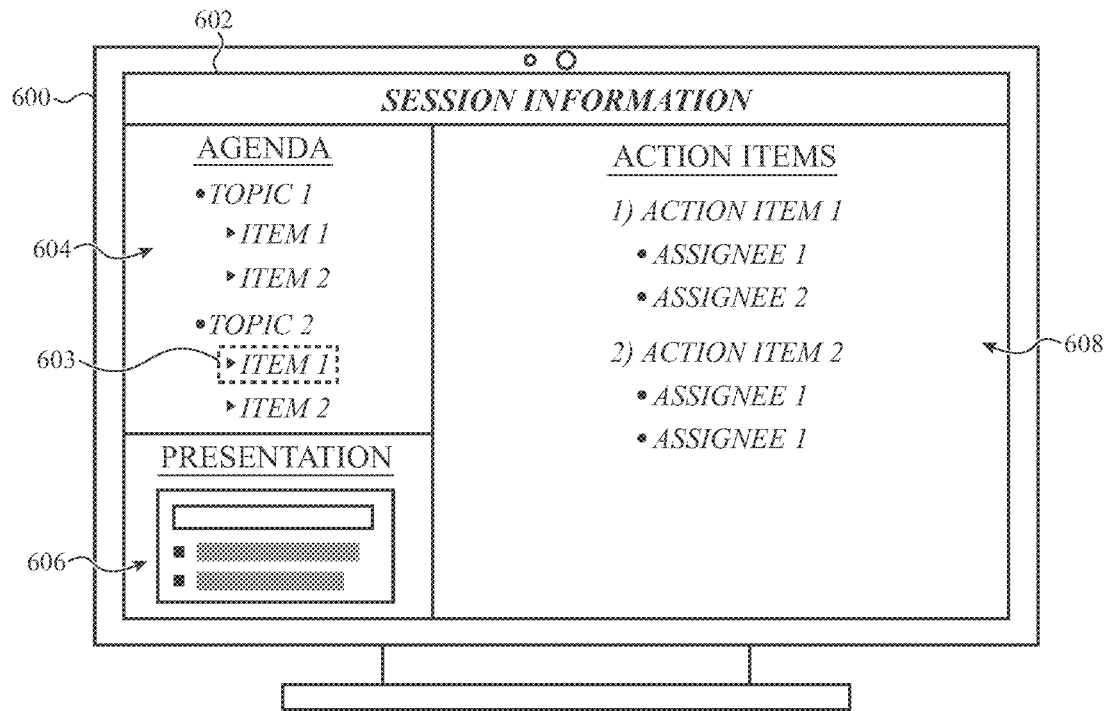
FIG. 6 depicts an example of a client device and user interface for displaying session information of a videoconference.

FIG. 6 depicts a client device 600 showing an example session information interface 602. The session information interface 602 may correspond to the session information regions 206, 306 described above. As shown in FIGS. 2-3D, the session information interface may be displayed along with other interface regions, such as video stream regions and participation analytics regions. FIG. 6 depicts the session information interface 602 in a full-screen mode, which may be selectable by individual users.

The session information interface 602 includes an agenda region 604, a presentation region 606, and a content input region 608. The agenda region 604 may display an agenda for a videoconference, which may have been prepared or provided prior to the videoconference time by a videoconference host or other user. The agenda region 604 may include a progress indicator 603 (e.g., the dashed box around "Topic 2, Item 1") that tracks the progress of the videoconference. The progress indicator 603 may be moved and/or updated manually by a participant (e.g., the host), or it may be automatically updated by the videoconferencing system 100. Where the progress indicator 603 is automatically updated by the videoconferencing system 100, the videoconferencing system 100 may analyze the audio streams of the videoconference to determine the subject matter of the discussion and/or otherwise determine which agenda item or topic is being addressed. The videoconferencing system 100 may then automatically display the progress indicator 603 in association with the appropriate agenda item or topic.

The presentation region 606 may display the slides of a presentation associated with the videoconference, and may optionally provide presentation controls to the presenter (who may be the host or a different participant). The presentation region 606 may also display files, images (still and/or video), documents, or any other content that is to be displayed or shared during the videoconference.

The content input region 608 may accept various types of input from the participants in the videoconference. The content input region 608 may be edited by all of the participants, or only a subset of the participants (e.g., only the host and/or those authorized by the host).

The content input region 608 may allow the creation of action items or tasks, and may facilitate the assignment of individuals or teams to the various tasks. Because the videoconferencing system 100 may be integrated with data stores and systems of a collaborative work environment, created action items or tasks, as well as assignments of individuals or teams to the tasks may be stored and utilized in other aspects of the collaborative work environment. For example, an assignment of an action item to an individual during a videoconference may cause the action item to be included on a list of action items associated with that individual, which may be accessed, monitored, updated, modified, and/or completed outside the context of the videoconference in which the action item was created and/or assigned. If a user is assigned to an action item during a videoconference, data about the action item and/or videoconference may also be associated with that user. For example, if a user is assigned to a task of updating a customer list during a videoconference about marketing efforts, data stores of the collaborative work environment may be updated to associate the user with concepts such as "marketing" and "customer lists." Such information may be accessed and used to track the expertise and experience of individuals within a work environment. Such associations may also be used to improve the assignment of tasks and/or other collaborations that are facilitated by the session information interface 602. For example, if an action item is created that relates to updating a customer list, the videoconferencing system 100 may determine (e.g., with reference to data stores about the videoconference participants) that several of the participants have expertise in customer lists. The videoconferencing system 100 may recommend that those users be assigned to the newly created action item (e.g., by displaying a list of the users along with an indication of why they were recommended).

As noted above, the videoconferencing system 100 may provide functions and services that facilitate the organization and creation of videoconferences. Indeed, the videoconferencing system 100 may provide services that extend beyond the videoconference itself. For example, the videoconference system 100 may assist in videoconference creation, provide document and presentation management services, assist in creating and maintaining agendas and follow-up items, aid in selecting participants, and the like.

Figure 7:
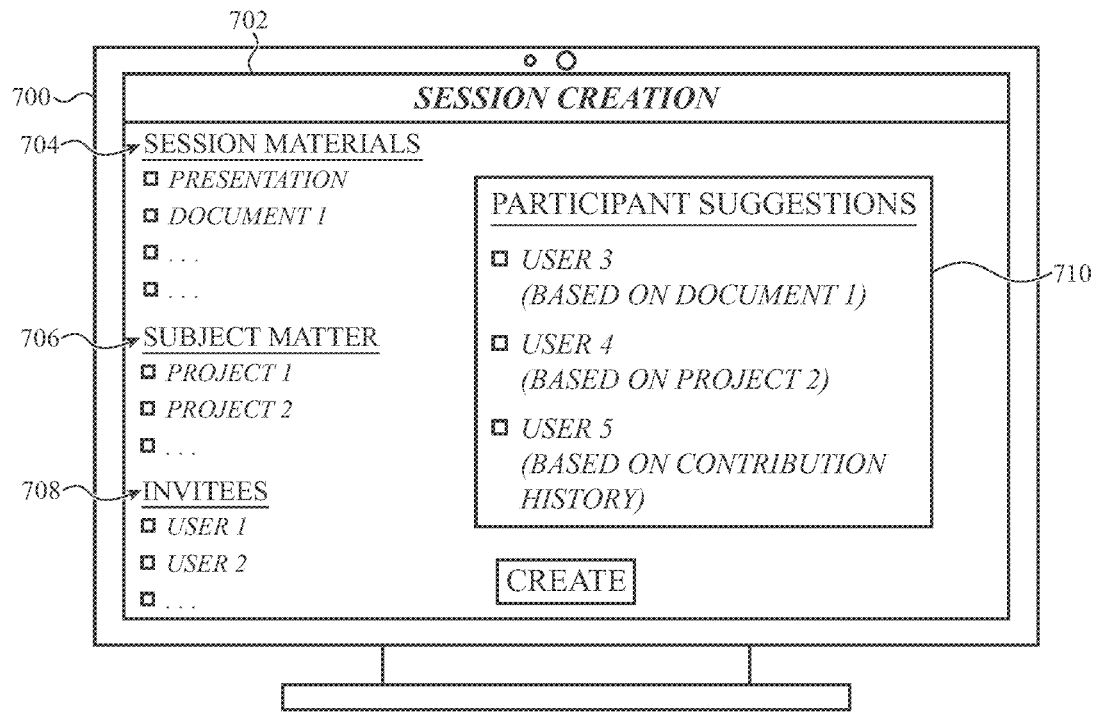
FIG. 7 depicts an example of a client device and user interface for creating videoconferences.

FIG. 7 depicts a client device 700 showing an example session creation interface 702. The session creation interface 702 provides an interface where users can create a videoconference and associate content with a videoconference. The session creation interface 702 may include a session materials region 704, a subject matter tagging region 706, an invitee input region 708, and a participant suggestion region 710.

The session materials region 704 provides an interface for a host or creator to select materials for presentation or access during the videoconference. For example, the host may select presentations (e.g., slide decks), documents, files, images (still and/or video), or any other suitable content. The materials that are selected may be displayed during the videoconference, accessible during the videoconference, or they may be identified in order to indicate subject matter(s) that will be addressed during the videoconference. In the latter case, the host may select the materials to facilitate the system-provided recommendations of participants (as described below). By selecting materials in the session materials region 704, the videoconferencing system 100 may link the videoconference being created to those documents (and their contents), which may be stored in data stores of the videoconferencing system 100 as described herein (e.g., the file store 804, FIG. 8). The link between the videoconference, the videoconference participants, the materials associated with or used during the videoconference, and the content generated during the videoconference (e.g., tasks, action items, etc.) may persist and be used to generate suggestions and content for future videoconferences or other purposes.

The subject matter tagging region 706 may provide an interface for a host or creator to select or identify subject matters that may be discussed during or that may be related to the content of the videoconference. The subject matter identifiers may be manually generated, selected from a list, or the like. Where the subject matter identifiers are selected from a list, the subject matter identifiers may be obtained from data stores associated with the collaborative work environment, including, for example, names or titles of projects associated with the collaborative work environment, names of documents or files, names of teams or groups within the collaborative work environment, products or services associated with the collaborative work environment, or the like.

The invitee input region 708 provides an interface for a host or creator to select invitees for the videoconference. The invitees may be manually entered, or may be selected from a list (e.g., an employee list associated with the collaborative work environment).

The participant suggestion region 710 displays participant suggestions that are generated by the videoconferencing system 100 based on parameters of the videoconference being created. The participant suggestions may be based on various factors, including without limitation the session materials associated with the videoconference, the subject matter associated with the videoconference, the current invitees of the videoconference, an individual's role or job title, an individual's contribution history (generally, or specifically related to a subject matter, file, or topic of the videoconference), or the like. The participation suggestion region 710 may also indicate a reason for the suggestion. For example, as shown in FIG. 7, the videoconferencing system 100 may suggest "User 3" as a participant, and may indicate that the suggestion is based on the user's association with "Document 1," which has been associated with the videoconference. As another example, the videoconferencing system 100 may suggest "User 4" as a participant, and may indicate that the suggestion is based on the user's association with "Project 2," which has been associated with the videoconference. As yet another example, the videoconferencing system 100 may suggest "User 5" as a participant, and may indicate that the suggestion is based on the fact that the user is a frequent contributor in videoconferences (e.g., those related to the subject matter or materials of this videoconference, or any videoconference that the user participates in).

The associations between users and the content or data associated with a videoconference, from which the participant suggestions may be generated, may include various different types of associations. For example, if a document is associated with the videoconference, the videoconferencing system 100 may identify users who authored, contributed to, or edited the document, and suggest all or some of those users to include. As another example, if a subject matter is associated with the videoconference, the videoconference system 100 may identify users who are associated with that subject matter by virtue of their job title or job description, their previous inclusion in videoconferences (or other collaborations or events) associated with that subject matter, their contribution to documents that are associated with that subject matter, or the like. These are merely some examples of ways in which the videoconferencing system 100 may identify associations between users and the content or data of a videoconference.

Figure 8:
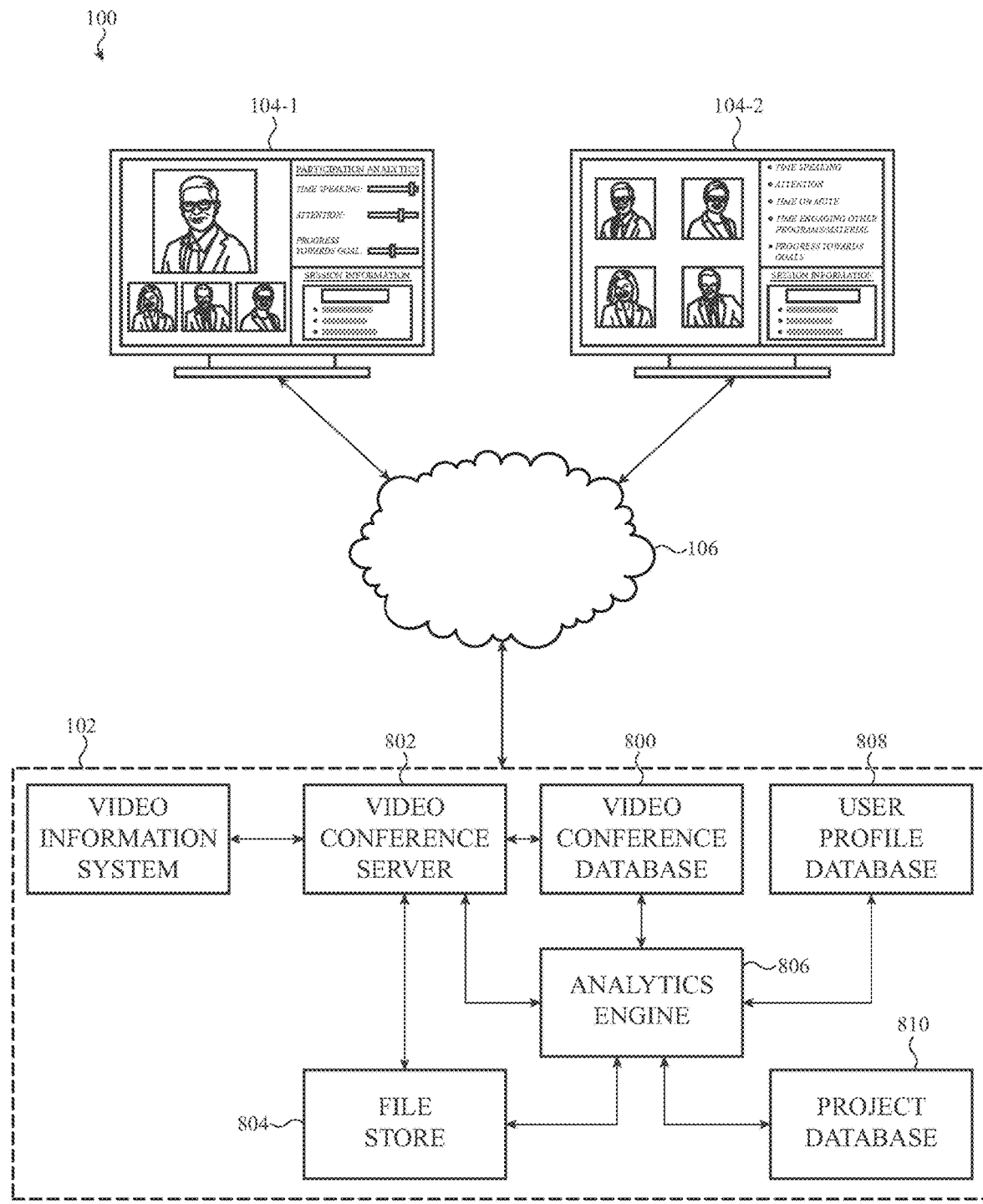
FIG. 8 depicts an example videoconferencing services system for use with the videoconferencing system.

FIG. 8 depicts the example videoconferencing system 100, showing additional details of the videoconference services system 102. The videoconference services system 102 may include a videoconference server 802, a videoconference database 800, a file store 804, a user profile database 808, a project database 810, and an analytics engine 806. These components may execute over one or more computing resources of the videoconference services system 102, and may share resources such as storage media, processors, memory, and the like. In some cases, they may be instantiated as separate computer systems (e.g., servers, databases, etc.) that communicate with one another to provide the functionality of the videoconference services system 102.

The videoconference server 802 may provide core videoconferencing services such as receiving videoconference streams (including audio and video streams) from multiple client devices, and routing audio and/or video streams to the client devices to facilitate the videoconference operations. The videoconference server 802 also receives content and other data (e.g., documents, files, presentations, participant suggestions, participation metrics, participation metric goal progress, etc.) from other systems and data stores of the videoconference services system 102 and serves the data to the client devices. The videoconference server 802 may also receive content and other data from the clients and serve it to other clients and/or store it in the data stores of the videoconference services system 102.

The videoconference database 800 may store data associated with videoconferences. For example, when a videoconference is created and/or held, the videoconference database 800 may store information and/or data about the videoconference. Such information and/or data may include documents, files, presentations, and/or other content that was associated with, used during, or otherwise referred to in the videoconference; invitees and/or participants in the videoconference; subject matter(s) associated with the videoconference; action items addressed or generated during the videoconference; or the like. The videoconference database 800 may also store data related to participation metrics and participation metric goals. For example, the videoconference database 800 (optionally in conjunction with the user profile database 808) may store participation metrics for individuals (historical/running participation metrics and/or participation metrics for individual videoconference events), participation metric goals, participation metric goal progress, participation factors (e.g., the data from which participation metrics may be generated), and the like.

The file store 804 may store files associated with the videoconferencing system 100, and/or the broader collaborative work environment that is served by the videoconferencing system 100. The file store 804 may include any suitable files, including but not limited to documents, presentations, emails, images (e.g., pictures, videos, etc.), engineering drawings (e.g., CAD files), spreadsheets, source code, or any other suitable computer-storable information.

The user profile database 808 may store user profiles of users of the videoconferencing system 100, and/or the broader collaborative work environment that is served by the videoconferencing system 100. User profiles may include data such as names; user names; employment status; employee title or role; teams, projects, or subject matters associated with the user; review-user authorizations and/or relationships; participation metrics; participation metric goals and goal progress; and the like.

The project database 810 may store data associated with projects within the videoconferencing system 100 and/or the collaborative work environment that is served by the videoconferencing system 100. The project database 810 may store data and/or data structures related to identified projects. For example, the project database 810 may store project information such as project names, project descriptions, project timelines, project due dates, lists of associated individuals, documents or other files, and the like. In some cases the project database 810 stores data structures that define relationships or links between content in and among the databases and/or data stores of the videoconferencing services system 102, such as user profiles (in the user profile database 808), files (in the file store 804), videoconference data (in the videoconference database 800), or the like.

The analytics engine 806 may access or receive data from other components of the videoconferencing system 100 to provide analytics services to the videoconferencing system 100. For example, the analytics engine 806 may be configured to generate participation metrics, update participation metrics in real time (e.g., during videoconferences), determine progress towards participation metric goals, and the like. For example, the analytics engine 806 may analyze audio content to determine an amount of time that a user is speaking, and generate a participation metric based on the amount of time that the user is speaking. The analytics engine 806 may determine the amount of time the user is speaking by analyzing the audio content from a given client device, and may include determining when the audio signal is above a threshold (e.g., indicating that the user is speaking), and optionally analyzing the content of the audio (e.g., to determine that the content is relevant to the videoconference).

As another example, the analytics engine 806 may analyze the video content to determine a facial expression of the user, and generate the participation metric based at least in part on the facial expression of the user. As yet another example, the analytics engine 806 may determine a duration that the facial expression of the user corresponds to a facial expression indicative of inattentiveness, and generate the participation metric based at least in part on the duration that the facial expression of the user corresponds to the facial expression indicative of inattentiveness. The analytics engine 806 may use various image and video processing techniques to determine whether a facial expression is indicative of inattentiveness, including, without limitation, gaze detection (e.g., determining that the user's eyes are not looking at the videoconference content), machine learning algorithms (e.g., analyzing the video content using a model that is trained on a corpus of images that are classified or tagged as being associated with attention or inattention), or the like.

The analytics engine 806 may also generate suggestions for session materials, subject matter, and invitees for videoconferences. For example, when a host is creating a videoconference (e.g., using the session creation interface 702), the analytics engine 806 may identify session materials, subject matter, and invitees based on the information that has been selected or entered for the videoconference. The analytics engine 806 may continue to refine or update the suggestions as additional information is associated with the videoconference (e.g., to suggest additional relevant invitees when an additional subject matter is added).

The analytics engine 806 may perform any processing or generating steps described and/or claimed herein, and may access information from various databases, file stores, or any other systems described herein or that may be employed in a videoconferencing system. The analytics engine 806 may provide data and results of its operations (e.g., participation metrics, participation metric goal progress, etc.) to the videoconference server 802 so that the data and results may be provided to client devices for display or presentation in the user interfaces described herein (e.g., participant interfaces, review-user interfaces, management interfaces, training interfaces, session information interfaces, session creation interfaces, etc.).

Unless otherwise stated, the terms "include" and "comprise" (and variations thereof such as "including", "includes", "comprising", "comprises", "comprised" and the like) are used inclusively and do not exclude further features, components, integers, steps, or elements.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

What is claimed is:

1. A method of monitoring a videoconference, the method comprising:
    receiving a videoconference stream from a client device of a plurality of client devices participating in a videoconference, the videoconference stream comprising:
        video content of a user of the client device; and
        audio content of the user of the client device;
    obtaining a user profile associated with the user of the client device, the user profile including role data associated with the user and corresponding to the user's position within an organizational structure;
    determining a videoconferencing metric goal associated with the client device based on the role data obtained from the user profile and historical usage data obtained during previous videoconferencing sessions;
    generating, during the videoconference and based at least in part on at least one of the video content, the audio content, and the videoconferencing metric goal, a participation metric for the user of the client device;

causing display, during the videoconference, first information based on the participation metric;

updating the participation metric during the videoconference to produce an updated participation metric; and causing display, during the videoconference, second information based on the updated participation metric.

2. The method of claim 1, wherein:

the historical usage data includes first historical usage data generated by a client device associated with the user during multiple previous videoconferencing sessions; and the videoconferencing metric goal is determined based on the first historical usage data and second historical usage data generated by another client device and associated with another user having a role corresponding to the role data associated with the user.

3. The method of claim 1, wherein the videoconferencing metric goal is determined based, at least in part, on a number of participants in the videoconference.

4. The method of claim 1, wherein the videoconferencing metric goal is scaled based on a multiplier determined, at least in part, on a length of time the user has been within the organizational structure.

5. The method of claim 1, wherein the first information and the second information are displayed on a display of the client device withing a graphical user interface of the videoconference.

6. The method of claim 1, wherein a size of the videoconference stream of the client device displayed on another client device of the plurality of client devices is determined, at least in part, on the participation metric.

7. The method of claim 1, wherein the participation metric is determined, at least in part, based on:

a speaking metric determined based on speaking activity of the user during the videoconference; and an attention metric based on observed activity of the user during the videoconference.

8. The method of claim 7, wherein the attention metric is determined based, at least in part, on application usage of software applications operating on the client device during the videoconference.

9. A method of monitoring a client device during a videoconference, the method comprising:

receiving, from a plurality of client devices participating in a videoconference, a plurality videoconference streams, each respective client device of the plurality of client devices associated with a respective user of a plurality of users;

obtaining a user profile for a particular user of the plurality of users;

determining a videoconference metric goal for the particular user based on historical usage data obtained during previous videoconferencing sessions and associated with the user profile;

generating, during the videoconference and based at least in part, on information in the respective videoconference streams from the respective client device and the videoconference metric goal, a participation metric for the particular user;

causing display, during the videoconference, first information based on the participation metric for the particular user;

updating the participation metric during the videoconference to produce an updated participation metric; and causing display, during the videoconference, second information based on the updated participation metric.

10. The method of claim 9, further comprising causing display of information corresponding to the videoconference metric goal and a progress indicator corresponding to recent videoconferencing activity of the particular user.

11. The method of claim 10, wherein the progress indicator is determined based at least in part, on a speaking metric measured during the recent videoconferencing activity.

12. The method of claim 9, wherein the videoconference metric goal is scaled based on a number of participants of the videoconference.

13. The method of claim 9, wherein the videoconference metric goal is determined based, at least in part, on role data obtained from the user profile.

14. The method of claim 13, wherein the videoconference metric goal is determined based, at least in part, on historical activity of other users having a role that corresponds to a role of the particular user.

15. The method of claim 13, wherein:

the historical usage data includes first historical usage data generated by a client device associated with the particular user during multiple previous videoconferencing sessions; and the videoconferencing metric goal is determined based on the first historical usage data and second historical usage data generated by another client device and associated with another user having a role corresponding to a role data of the particular user.

* * * * *